(12) United States Patent
Skov et al.

(10) Patent No.: US 10,680,768 B2
(45) Date of Patent: *Jun. 9, 2020

(54) METHOD AND APPARATUS FOR RESOURCE AGGREGATION IN WIRELESS COMMUNICATIONS

(71) Applicant: Nokia Solutions and Networks Oy, Espoo (FI)

(72) Inventors: Peter Skov, Beijing (CN); Xiaoyi Wang, Hoffman Estates, IL (US); Chunli Wu, Beijing (CN)

(73) Assignee: HMD Global Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/828,495

(22) Filed: Dec. 1, 2017

(65) Prior Publication Data

US 2018/0091268 A1    Mar. 29, 2018

Related U.S. Application Data

(63) Continuation of application No. 14/130,778, filed as application No. PCT/CN2011/076851 on Jul. 5, 2011, now Pat. No. 9,853,781.

(51) Int. Cl.
  *H04L 5/00* (2006.01)
  *H04L 5/22* (2006.01)
  (Continued)

(52) U.S. Cl.
  CPC .............. *H04L 5/003* (2013.01); *H04L 5/001* (2013.01); *H04L 5/0007* (2013.01);
  (Continued)

(58) Field of Classification Search
  CPC ......... H04L 5/00; H04L 5/0007; H04L 5/001; H04L 5/003; H04L 5/0035; H04L 5/22; H04W 72/00; H04W 88/02
  See application file for complete search history.

(56) References Cited

U.S. PATENT DOCUMENTS

| 8,254,366 B2 | 8/2012 | Mishra et al. ................ 370/349 |
| 8,619,666 B2 | 12/2013 | Nishiyama et al. .......... 370/324 |

(Continued)

FOREIGN PATENT DOCUMENTS

| CN | 101616484 A | 12/2009 |
| CN | 101873648 A | 10/2010 |

(Continued)

OTHER PUBLICATIONS

Ericsson; "Control plane aspects of carrier aggregation"; 3GPP Mobile Competence Centre R2-092958; San Francisco, USA, 4th—Apr. 28, 2009.

(Continued)

*Primary Examiner* — Sulaiman Nooristany
(74) *Attorney, Agent, or Firm* — Harrington & Smith

(57) ABSTRACT

Methods and apparatus for cell aggregation are disclosed. In accordance with one aspect information regarding a predefined maximum number of cells that can be aggregated by a communication device on a single carrier resource is sent by the communication device. Said Information is received by a network node where after control on cell aggregation can be based on the information, and the communication device can support cell aggregation on the single carrier resource up to said maximum number of cells.

35 Claims, 3 Drawing Sheets

Determine suitability for cell aggregation — 40

Signal capability information including an indication of maximum number of cells M — 42

Communicate on a single carrier resource via up to M shared channels — 44

(51) Int. Cl.
*H04W 72/00* (2009.01)
*H04W 88/02* (2009.01)

(52) U.S. Cl.
CPC .............. *H04L 5/0035* (2013.01); *H04L 5/22* (2013.01); *H04W 72/00* (2013.01); *H04W 88/02* (2013.01)

(56) References Cited

U.S. PATENT DOCUMENTS

| | | | |
|---|---|---|---|
| 8,620,280 B2 | 12/2013 | Liu et al. | 455/414.1 |
| 8,976,745 B2 | 3/2015 | Kwon | 370/329 |
| 9,025,539 B2* | 5/2015 | Umesh | H04W 52/242 |
| | | | 370/318 |
| 2005/0197120 A1 | 9/2005 | Kuchibhotla et al. | 455/435.1 |
| 2006/0221872 A1* | 10/2006 | Jones | H04B 7/2643 |
| | | | 370/276 |
| 2009/0116468 A1* | 5/2009 | Zhang | H04L 5/0007 |
| | | | 370/342 |
| 2010/0002575 A1* | 1/2010 | Eichinger | H04L 5/0046 |
| | | | 370/210 |
| 2010/0041384 A1 | 2/2010 | Kazmi | 455/419 |
| 2010/0142508 A1* | 6/2010 | Walley | H04W 72/048 |
| | | | 370/343 |
| 2010/0254329 A1 | 10/2010 | Pan | 370/329 |
| 2010/0303011 A1 | 12/2010 | Pan | |
| 2010/0303039 A1 | 12/2010 | Zhang | 370/331 |
| 2010/0316146 A1* | 12/2010 | McBeath | H04L 5/0091 |
| | | | 375/260 |
| 2010/0331037 A1 | 12/2010 | Jen | 455/522 |
| 2011/0003555 A1* | 1/2011 | Guo | H04L 5/001 |
| | | | 455/67.11 |
| 2011/0026422 A1* | 2/2011 | Ma | H04W 72/0453 |
| | | | 370/252 |
| 2011/0032848 A1 | 2/2011 | Sagae | 370/278 |
| 2011/0034171 A1 | 2/2011 | Choi | 455/436 |
| 2011/0044292 A1 | 2/2011 | Eravelli | 370/332 |
| 2011/0053490 A1 | 3/2011 | Wu | 455/3.01 |
| 2011/0070880 A1* | 3/2011 | Song | H04L 5/001 |
| | | | 455/423 |
| 2011/0075624 A1* | 3/2011 | Papasakellariou | H04L 5/0053 |
| | | | 370/329 |
| 2011/0098054 A1 | 4/2011 | Gorokhov | 455/452.1 |
| 2011/0105105 A1 | 5/2011 | Sagfors et al. | |
| 2011/0129025 A1 | 6/2011 | Jaeckel et al. | 375/260 |
| 2011/0149781 A1* | 6/2011 | Zhou | H04W 28/00 |
| | | | 370/252 |
| 2011/0158164 A1 | 6/2011 | Palanki et al. | 370/328 |
| 2011/0170496 A1* | 7/2011 | Fong | H04L 5/0053 |
| | | | 370/329 |
| 2011/0176634 A1 | 7/2011 | Yoon | 375/295 |
| 2011/0199986 A1 | 8/2011 | Fong et al. | 370/329 |
| 2011/0201370 A1* | 8/2011 | Lim | H04L 5/001 |
| | | | 455/509 |
| 2011/0218011 A1 | 9/2011 | Kim | 455/517 |
| 2011/0228666 A1 | 9/2011 | Barbieri et al. | 370/216 |
| 2011/0269447 A1* | 11/2011 | Bienas | H04W 8/22 |
| | | | 455/422.1 |
| 2011/0280203 A1* | 11/2011 | Han | H04L 1/0031 |
| | | | 370/329 |
| 2011/0299489 A1 | 12/2011 | Kim | 370/329 |
| 2011/0310832 A1 | 12/2011 | Hammarwall | 370/329 |
| 2012/0040687 A1 | 2/2012 | Siomina et al. | 455/456.1 |
| 2012/0099553 A1 | 4/2012 | Aiba | 370/329 |
| 2012/0113839 A1 | 5/2012 | Etemad | 370/252 |
| 2012/0113962 A1* | 5/2012 | Jen | H04L 1/16 |
| | | | 370/336 |
| 2012/0140708 A1* | 6/2012 | Choudhury | H04W 72/082 |
| | | | 370/328 |
| 2012/0170507 A1 | 7/2012 | Sawai | 370/315 |
| 2012/0182858 A1 | 7/2012 | Nakao | 370/216 |
| 2012/0182949 A1 | 7/2012 | Aiba | 370/329 |
| 2012/0257531 A1 | 10/2012 | Ko | 370/252 |
| 2012/0281636 A1 | 11/2012 | Xiao et al. | 370/329 |
| 2012/0282964 A1 | 11/2012 | Xiao et al. | 455/515 |
| 2012/0294242 A1* | 11/2012 | Cheng | H04W 92/22 |
| | | | 370/328 |
| 2012/0314637 A1 | 12/2012 | Kim | 370/311 |
| 2012/0327876 A1 | 12/2012 | Ouchi | 370/329 |
| 2013/0003552 A1 | 1/2013 | Lott et al. | 370/235 |
| 2013/0003788 A1 | 1/2013 | Marinier | 375/219 |
| 2013/0051306 A1 | 2/2013 | Gou et al. | 370/312 |
| 2013/0128832 A1 | 5/2013 | Kang | 370/329 |
| 2013/0178221 A1 | 7/2013 | Jung | 455/450 |
| 2013/0225188 A1 | 8/2013 | Seo et al. | 455/450 |
| 2013/0230013 A1 | 9/2013 | Seo et al. | 370/329 |
| 2013/0235756 A1 | 9/2013 | Seo et al. | 370/252 |
| 2014/0064251 A1 | 3/2014 | Skov | 370/331 |
| 2014/0112282 A1 | 4/2014 | Wijting et al. | 370/329 |
| 2014/0161002 A1 | 6/2014 | Gauvreau | 370/280 |
| 2014/0198744 A1* | 7/2014 | Wang | H04B 7/0617 |
| | | | 370/329 |
| 2014/0204854 A1 | 7/2014 | Freda | 370/329 |
| 2014/0286184 A1 | 9/2014 | Kim et al. | 370/252 |

FOREIGN PATENT DOCUMENTS

| | | |
|---|---|---|
| CN | 102026324 A | 4/2011 |
| WO | WO-2011/023042 A1 | 3/2011 |

OTHER PUBLICATIONS

R1-111542; Qualcomm Incorporated; "Summary of System Performance Evaluation of SF-DC aggregation Schemes Assuming Realistic RLC and Flow Control"; 3GPP TSG RAN WG1 Meeting #65; Barcelona, Spain, May 9-13, 2011.

R1-111116; 3GPP TR 25.8xx V0.1.3 (Mar. 2011); 3rd Generation Partnership Project; Technical Specification Group Radio Access Network; HSDPA Multipoint Transmission (Release 11).

* cited by examiner

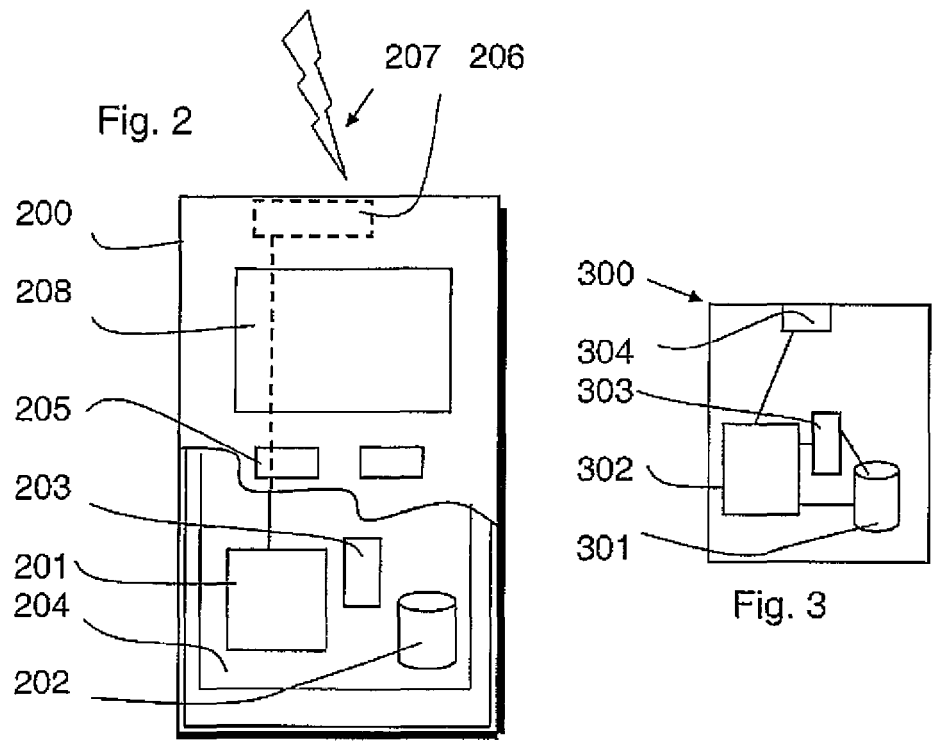
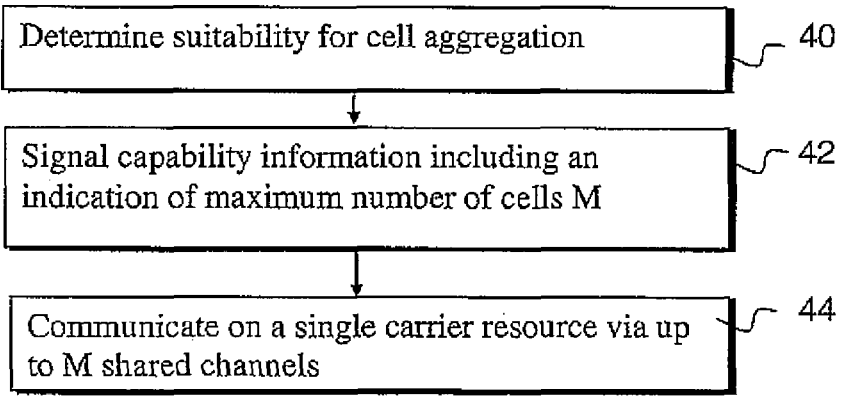
Fig. 4

METHOD AND APPARATUS FOR RESOURCE AGGREGATION IN WIRELESS COMMUNICATIONS

CROSS REFERENCE TO RELATED APPLICATIONS

This application is a Continuation Application of co-pending U.S. patent application Ser. No. 14/130,778 filed on Feb. 21, 2014, which is the national phase entry of International (PCT) Patent Application Serial No. PCT/CN2011/076851, filed Jul. 5, 2011, published under PCT Article 21(2) in English.

The application relates to resource aggregation in wireless communications and more particularly to single carrier resource aggregation in a communication system.

A communication system can be seen as a facility that enables communication sessions between two or more nodes such as fixed or mobile communication devices, access nodes such as base stations, servers and so on. A communication system and compatible communicating entities typically operate in accordance with a given standard or specification which sets out what the various entities associated with the system are permitted to do and how that should be achieved. For example, the standards, specifications and related protocols can define the manner how communication devices shall communicate with the access nodes, how various aspects of the communications shall be implemented and how the devices shall be configured.

A communication can be carried on wired or wireless carriers. Examples of wireless systems include public land mobile networks (PLMN) such as cellular networks, satellite based communication systems and different wireless local networks, for example wireless local area networks (WLAN). Wireless systems can be divided into coverage areas referred to as cells, such systems being often referred to as cellular systems. An example of cellular communication systems is an architecture that is being standardized by the 3rd Generation Partnership Project (3GPP). This system is often referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

Radio services areas are typically referred to as cells. A cell can be provided by a base station, there being various different types of base stations. Different types of cells can provide different features. For example, cells can have different shapes, sizes and other characteristics.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station of an access network and/or another user equipment. The communication device may access a carrier provided by a base station, and transmit and/or receive communications on the carrier.

Carrier aggregation (CA) can be used to increase performance. In carrier aggregation a plurality of component carriers on different frequencies are aggregated to increase bandwidth. In accordance with LTE Release 10 user equipment carrier aggregation (UECA) capability integrates all carrier aggregation (CA) features in a capability set. In LTE release 10 UE CA capability has been comprehensively defined and includes features such as those related to UE radio frequency (RF) properties, decoding/encoding, hybrid automatic repeat request (HARQ) signalling support, blind decoding, the secondary serving cell (SCC) management, dual-Component Carrier capability, capability to monitor physical downlink control channel (PDCCH) on multiple cells, and so on. In other words, if a user equipment supports carrier aggregation (CA), it shall support all CA related features. Such a user equipment is necessarily a dual component carrier capable user equipment operable on multiple frequency resources. However, a user equipment that is capable only for communications on a single frequency carrier at a time cannot be configured to support the required dual component carrier aggregation related features and thus cannot provide any aggregation. On the other hand, single frequency communication devices may be desired in certain occasions, for example due to the lesser complexity and cost thereof.

According to an aspect, there is provided n apparatus for a communication device, the apparatus comprising at least one processor, and at least one memory including computer program code, wherein the at least one memory and the computer program code are configured, with the at least one processor, to support cell aggregation for communications with a multiple of cells of a communication system based on a predefined maximum number of cells on a single carrier resource that can be aggregated by the communication device.

According to another aspect there is provided an apparatus for controlling cell aggregation, the apparatus comprising at least one processor, and at least one memory including computer program code, wherein the at least one memory and the computer program code are configured, with the at least one processor, to receive from a communication device information of a predefined maximum number of cells the communication device supports for cell aggregation on a single carrier resource, and to control cell aggregation by the communication device based on the information.

According to another aspect there is provided a method for cell aggregation, comprising signalling information regarding a predefined maximum number of cells that can be aggregated by a communication device on a single carrier resource, and supporting cell aggregation for communications by the communication device on the single carrier resource with a multiple of cells up to said maximum number of cells.

According to another aspect there is provided a method for controlling cell aggregation, comprising receiving information of a predefined maximum number of cells a communication device supports for cell aggregation on a single carrier resource, and controlling cell aggregation on the single carrier resource by the communication device based on the information.

According to a yet another aspect there is provided a method and apparatus for communications on a system where cell aggregation is available, wherein single frequency resource aggregation is provided for communications by a first communication device configured with a subset of capabilities selected from a set of capabilities defined for a communication device capable of component carrier communication on multiple frequency resources, and single frequency resource aggregation for is provided communications by at least one second communication device configured with a different subset of capabilities selected from said set of capabilities defined for a communication device capable of component carrier communication on multiple frequency resources.

In accordance with a more detailed embodiment an indication of the maximum number of cells is signalled from the communication device. The signalling can be explicit or implicit. The indication may be signalled in capability information of the communication device.

The maximum number of cells may be defined by means of a capability information parameter.

The communication device may be configured for simultaneous transmission to and/or reception from multiple cells on the single carrier resource. According to an embodiment the communication device is configured to separate transmission and/or reception on the single carrier resource based on time division multiplexing.

The single carrier resource may comprise a single frequency carrier.

The predefined maximum number of cells may define the maximum number of physical shared channels and/or physical control channels that can be received or transmitted by the communication device.

The apparatus may be configured to monitor for an identity at a time in a search space up to the predefined maximum number of cells. Alternatively, simultaneous monitoring of a plurality of identities in a search space up to the predefined maximum number of cells may be provided.

Single frequency resource communications with multiple cells can be provided based on a set of capabilities selected from a set of capabilities for communications on a multi-frequency component carrier.

Information of the predefined maximum number of cells may be signalled in response to a request for capability information.

Signalling fort controlling the cell aggregation may be provided from a cell or from a plurality of cells depending on the capability category of the communication device.

One of the cells may grant a physical downlink shared channel provided by any of the multiple of cells.

Downlink assignments may be provided either with or without a cell indicator depending on the capability category of the communication device.

Power control may be provided on a serving cell basis.

A node such as a base station or a mobile station can be configured to operate in accordance with the various embodiments.

A computer program comprising program code means adapted to perform the method may also be provided.

It should be appreciated that any feature of any aspect may be combined with any other feature of any other aspect.

Embodiments will now be described in further detail, by way of example only, with reference to the following examples and accompanying drawings, in which:

FIG. 2 shows a schematic diagram of a mobile communication device according to some embodiments;

FIG. 3 shows a schematic diagram of a control apparatus according to some embodiments; and FIGS. 4 and 5 show schematically flowcharts according to certain embodiments.

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

A non-limiting example of the recent developments in communication system architectures is the long-term evolution (LTE) of the Universal Mobile Telecommunications System (UMTS) that is being standardized by the 3rd Generation Partnership Project (3GPP). As explained above, further development of the LTE is referred to as LTE-Advanced. The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

Figure 1:
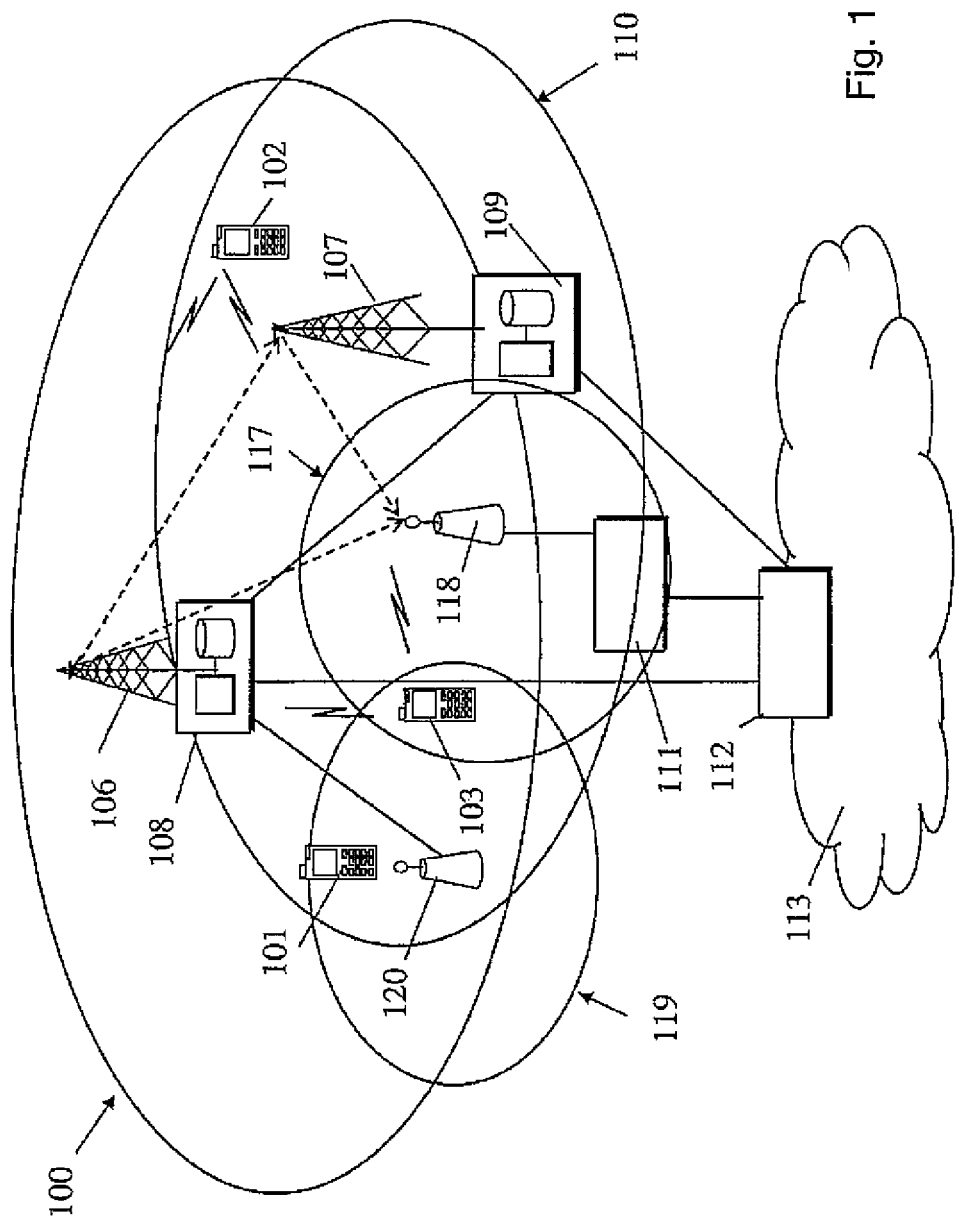
FIG. 1 shows a schematic diagram of a network according to some embodiments.

A communication device 101, 102, 103 is typically provided wireless access via at least one base station or similar wireless transmitter and/or receiver node of an access system. In FIG. 1 different neighbouring and/or overlapping access systems or radio service areas 100, 110, 117 and 119 are shown being provided by base stations 105, 106, 118 and 119. It is noted that instead of four access systems, any number of access systems can be provided in a communication system. An access system can be provided by a cell of a cellular system and therefore the access system will be referred to hereinafter as cells. It is noted that the cell borders are schematically shown for illustration purposes only in FIG. 1. It shall be understood that the sizes and shapes of the cells or other radio service areas may vary considerably from the similarly sized omni-directional shapes of FIG. 1.

A base station site can provide one or more cells or sectors, each sector providing a cell or a subarea of a cell. A radio link within a cell can be identified by a single logical identification. Each communication device and base station may have one or more radio channels open at the same time and may send signals to and/or receive signals from more than one source Base stations are typically controlled by at least one appropriate controller apparatus so as to enable operation thereof and management of mobile communication devices in communication with the base stations. FIG. 1 shows control apparatus 107 and 109. The control apparatus can be interconnected with other control entities. The control apparatus can typically be provided with memory capacity and at least one data processor. The control apparatus and functions may be distributed between a plurality of control units. In some embodiments, each base station can comprise a control apparatus. In alternative embodiments, two or more base stations may share a control apparatus. Currently LTE does not have a separate radio network controller. In some embodiments the control apparatus may be respectively provided in each base station.

Different types of possible cells include those known as macro cells, pico cells and femto cells. For example, in LTE-Advanced the transmission/reception points or base stations can comprise wide area network nodes such as a macro eNode B (eNB) which may, for example, provide coverage for an entire cell or similar radio service area. Base station can also be provided by small or local radio service area network nodes, for example Home eNBs (HeNB), pico eNodeBs (pico-eNB), or femto nodes. Some applications utilise radio remote heads (RRH) that are connected to for example an eNB. Cell areas typically overlap, and thus a communication device in an area can listen to more than one base station. Smaller radio service areas can be located entirely or at least partially within a larger radio service area. A communication may thus communicate with more than one cell. In some embodiments LTE-Advanced network nodes can comprise a combination of wide area network nodes and small area network nodes deployed using the same frequency carriers (e.g. co-channel deployment).

In particular, FIG. 1 depicts a first cell 100. In this example the first cell 100 is provided by a wide area base station 106, which can be a macro-eNB. The macro-eNB 106 transmits and receives data over the entire coverage of the cell 100. A second cell 110 in this example is a pico-cell. A third cell 117 is provided by a suitable small area network node 118 such as Home eNBs (HeNB) (femto cell) or another pico eNodeBs (pico-eNB). HeNBs may be configured to support local offload and may support any user equipment (UE) or UEs belonging to a closed subscriber group (CSG) or an open subscriber group (OSG) and transmit and receive data over the coverage area of the third cell 117. A fourth cell 119 is provided by a remote radio head (RRH) 120 connected to the base station apparatus of cell 100.

One technique of communicating over a wireless interface relies on combining the results of detecting a transmission from a communications device at a plurality of cells or detecting a transmission based on signals transmitted from a plurality of cells. This is commonly known as coordinated multipoint transmission (CoMP). CoMP can be provided for example in heterogeneous network scenarios where there is a centralised processing unit, for example where there is a single controlling macro eNB.

In FIG. 1 stations 106 and 107 are shown as connected to a wider communications network 113 via gateway 112. A further gateway function may be provided to connect to another network. The smaller stations 118 and 120 can also be connected to the network 113, for example by a separate gateway function and/or via the macro level cells. In the example, station 118 is connected via a gateway 111 whilst station 120 connects via the controller apparatus 108. Base station may communicate via each other via fixed line connection and/or air interface, for example over an X2 interface.

As shown, each of the communication devices 101, 102 and 103 is located within the area of at least two cells, and can thus be in simultaneous communications with more than one cell. For example, all of the communication devices are within the service area of the macro cell base station 106 and its associated controller 109 which is further coupled to the pico cell base station controller 109 and to the femto cell gateway 111. The macro cell base station 106 is configured to communicate to communication devices operating within the range of the macro cell in such a way that the downlink is able to transmit control and signal information from the macro cell base station antenna to the communication devices. Similarly, communication devices 102 and 103 may be configured to transmit via an uplink to the pico cell base station 107 and also in some embodiments transmit at least control information via a control channel to the macro cell base station 106. Communication device 103 may also communicate with at least one of cells 117 and 119.

A possible mobile communication device for transmitting to and receiving from a plurality of base stations will now be described in more detail with reference to FIG. 2 showing a schematic, partially sectioned view of a communication device 200. Such a communication device is often referred to as user equipment (UE) or terminal. An appropriate mobile communication device may be provided by any device capable of sending radio signals to and/or receiving radio signals from multiple cells. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The mobile device may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile communication device is also provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the mobile device by means of a suitable user interface such as keypad 205, voice commands, touch sensitive screen or pad, combinations thereof or the like. A display 208, a speaker and a microphone can be also provided. Furthermore, a mobile, communication device may comprise appropriate connectors (either wired or wireless) to other devices and/or for connecting external accessories, for example hands-free equipment, thereto.

FIG. 3 shows an example of a control apparatus for a communication system, for example to be coupled to and/or for controlling a station of an access system. In some embodiments base stations comprise a separate control apparatus. In other embodiments the control apparatus can be another network element. The control apparatus 300 can be arranged to provide control on communications in the service area of the system. The control apparatus 300 can be configured to provide control functions in association with cell aggregation on a single carrier resource by means of the data processing facility in accordance with certain embodiments described below. For this purpose the control apparatus comprises at least one memory 301, at least one data processing unit 302, 303 and an input/output interface 304. Via the interface the control apparatus can be coupled to a receiver and a transmitter of the base station. The control apparatus can be configured to execute an appropriate software code to provide the control functions. It shall be appreciated that similar component can be provided in a control apparatus provided elsewhere in the system for controlling reception of sufficient information for decoding of received information blocks.

A wireless communication device, such as a mobile or base station, can be provided with a Multiple Input/Multiple Output (MIMO) antenna system. MIMO arrangements as such are known. MIMO systems use multiple antennas at the transmitter and receiver along with advanced digital signal processing to improve link quality and capacity. The transceiver apparatus 206 of FIG. 2 can provide a plurality of antenna ports. More data can be received and/or sent where there are more antennae elements.

The following describes certain exemplifying embodiments where cell aggregation is provided for communication by a communication device. Cell aggregation can be understood as an intra-frequency inter-site combination, a difference to carrier aggregation being that carrier aggregation is provided over multiple frequencies whereas cell aggregation can be provided on a single carrier resource, such as on a single frequency band. Therefore cell aggregation requires different capability from the communication device to that of carrier aggregation. For example, a cell aggregation capable radio only needs to support one frequency.

FIG. 4 shows an example for operation at a communication device that is capable for cell aggregation. At step 40 the communication device may determine if cell aggregation would provide any benefit, or if it is even possible. At 42 the communication device can then signal information regarding a predefined maximum number of cells that can be aggregated by a communication device on a single carrier resource. Based on this information the network can control the communication accordingly and assign appropriate resources, where after support can be provided at 44 for cell aggregation for communications by the communication device on the single carrier resource with a multiple of cells up to said maximum number of cells.

Figure 5:
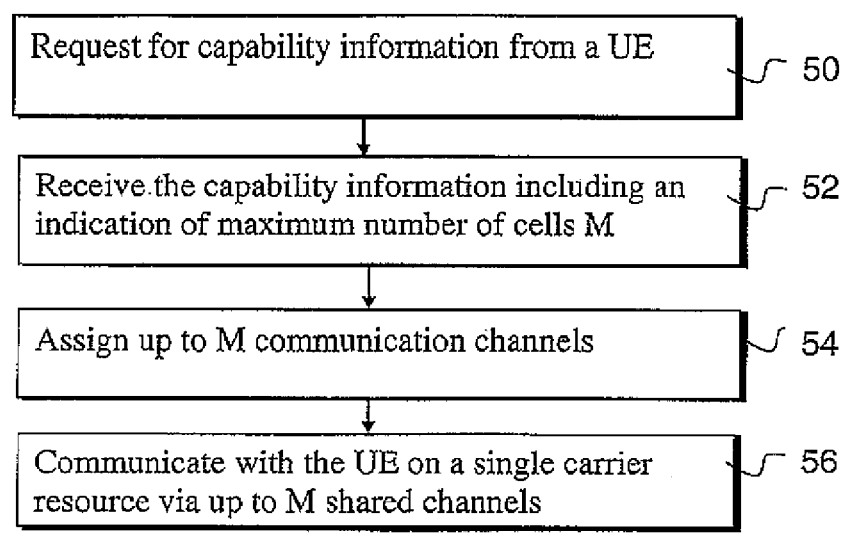

FIG. 5 illustrates an example of how to control the cell aggregation at the network side. When a new communication device enters a cell, capability information may be requested from it at 50. Information of a predefined maximum number of cells the communication device supports for cell aggregation on a single carrier resource can be received at 52 as a part of the requested capability information. Cell aggregation on the single carrier resource by the communication device can then be controlled based on the received information. For example, the relevant network controller can assign communication channels and other resources at 54 up to the maximum number of cells and provide appropriate control for the communications on the single carrier resource at 56.

The following more detailed embodiments describe cell aggregation capability categories of a communication device with reference to a communication device provided by a LTE enabled a user equipment (UE). In the described user equipment categories only features that are needed to support single frequency cell aggregation are provided, with varying degree of sophistication. As discussed above, dual component carrier user equipments, i.e. user equipments that can communicate on multiple frequencies, can get benefit from carrier aggregation and also from cell aggregation. However, single frequency carrier user equipments are not provided with all of the required essential features of the carrier aggregation capability set, as defined e.g. by LTE release 10. The inventors have found that single frequency cell aggregation does not even require all of the UE capabilities that are defined for multi-frequency carrier aggregation (CA) in LTE Release 10 and that only a sub-set of the carrier aggregation capabilities would be required in support of cell aggregation. Such devices are nevertheless prevented from using cell aggregation due to the lacking features.

In accordance with certain embodiments reduced user equipment (UE) capability sets are defined for a user equipment for use in cell aggregation. In accordance with an embodiment UE CA features defined in LTE Release 10 are arranged in subgroups such that one or multiple new UE capability classes or sets can be provided for single frequency cell aggregation. In each capability class only a subset of LTE Release 10 carrier aggregation (CA) features is supported. Thus a plurality of different user equipment categories or types can be provided, each of the types and related behaviours supporting multiple serving cells on a single carrier resource. For example, monitoring of temporary identifiers assigned for the user equipment by the access system can be handled differently, depending on the capability set configuration. Also, granting of physical shared channels and communications on physical shared channels (e.g. PDSCH, PUSCH) can be handled differently depending on the configured capabilities. Further examples where different configurations may be provided depending on the capability set relate to downlink assignments and power control.

The categorization of user equipment capabilities based on the existing carrier aggregation framework enables production of several different cell aggregation user equipment capability groups and user equipments with different level of complexity and cost. Thus cell aggregation may be supported at an optimised complexity and cost, depending on the needs of users. Use of the existing features as a starting point may also provide advantage in that a minimal amount of standardization is required since existing carrier aggregation features may be reused.

Simultaneous or non-simultaneous downlink (DL) reception and/or uplink (UL) transmissions can be supported depending on the capability class. The non-simultaneous communications can be separated by means of time division multiplexing (TDM).

In accordance with an embodiment a parameter for cell aggregation capability can be signalled from the user equipment in user equipment (UE) capability signalling for indication of the number of downlink (DL) same frequency cells which the user equipment can aggregate. For example, a base station can ask from the UE for its capability information and the UE can signal the capability information with an indication of its cell aggregation capabilities back to the base station. Signalling of the cell aggregation capability information can be explicit or implicit. For simplicity, a parameter indicating the maximum number of supported cells is denoted in the following as M.

It is noted that even if the user equipment supports cell aggregation feature up to M cells, the arrangement can be such that it only uses cell aggregation when radio conditions are such that use of cell aggregation is beneficial. For example, if the user equipment can only detect one cell there is no need for it even to try to connect to more cells.

The parameter M can be defined by the vendor of the user equipment, for example based on a standardised framework of user equipment categories. High M value can mean relatively high requirements from the user equipment implementation. For example, baseband processing, signalling support, measurement capability, and so forth are required. This also means increased complexity and higher cost of user equipment chipset, and thus would most likely be used for high-end user equipments. A lower M would in this scenario mean less complex and thus easier implementation, thus resulting a lower cost user equipment.

Various possible user equipment cell aggregation capability categories can be provided based on the features of a multi-frequency capability set, such as the LTE Release 10 capability set discussed above. Non-limiting examples of possible capability sets are referred below as cell aggregation capability sets 1 to 5.

Cell aggregation Capability set 1 provides for downlink (DL) cross cell scheduling. Based on this set an user equipment is capable of supporting:
1. A physical downlink control channel (PDCCH) monitoring for a Cell Radio Network Temporary identity (C-RNTI) on a user equipment specific search space for one Serving Cell. Up to M PDCCHs can be provided in one user equipment specific search space per user equipment. The channels are provided non-simultaneously.
2. Physical Downlink Shared Channel (PDSCH) reception on up to M Serving Cells on same frequency. The reception is non-simultaneous.
3. DL assignments with cell indicator (Carrier or Cell Indicator Field) CIF for CA cross scheduling can be reused, and thus no new LTE Downlink Control Information (DCI) formats need to be defined.

Cell aggregation Capability set 2 for DL cell aggregation. Based on this set an user equipment (UE) is capable of:
1. PDCCH monitoring for C-RNTI on user equipment specific search space on M Serving Cells.
2. PDSCH reception on up to M Serving Cells on same frequency.
3. DL assignments without cell indicator (CIF bits in accordance with LTE Release10 Downlink Control Information; DCI)

Cell aggregation Capability set 3 for advanced DL cell aggregation. This set is a combination of capability sets 1 and 2 above. Based on this set user equipment capabilities are:
1. PDCCH monitoring for C-RNTI on user equipment specific search space on M Serving Cells.
2. PDCCH monitoring for C-RNTI on multiple UE specific search spaces on one serving Cell.
3. PDSCH from any cell can only be granted by PDCCH in one cell.
4. PDSCH reception, on up to M Serving Cells on same frequency.
5. DL assignments with cell indicator Cell aggregation Capability set 4 for UL cell aggregation. This set requires cell aggregation capability of set 1, 2 or 3. User equipment configured in accordance with this set is capable of:
1. PUSCH transmission on up to M Serving Cells on same frequency. The transmissions are not simultaneous.
2. Physical Hybrid ARQ Indicator Channel (PHICH) reception for PUSCH transmissions on up to M serving cells (SCells).
3. Periodic Sounding Reference Symbols (SRS) transmission on M Serving Cells, as per RRC configuration on same frequency, not simultaneous.
4. Power control on a per Serving Cell basis According to a possibility a fifth cell aggregation capability set can be provided by adding UL grants with cell indicator to capability set 4.

The above capability sets highlight the features that differentiate between the different capability categories 1 to 5. Naturally, the lists are not exhaustive and other features of a control channel may be provided in practise. The other features can also be based on the full carrier aggregation (CA) capability set. For example, feedback mechanism such as Ack/Nak on Physical Uplink Shared Channel (PUSCH)/Physical Uplink Control Channel (PUCCH) and/or Channel Quality Indicator/Precoding Matrix Index/Rank Indicator (CQI/PMI/RI) periodical/aperiodical feedback may be added. A more detailed example of the further features is described below where a set of possible cell aggregation capability requirements is given in relation to the above aggregation capability set 1:

1) PDCCH monitoring for C-RNTI on UE specific search space for one Serving Cell (S-Cell). Up to M PDCCH in one UE specific search space per UE can be monitored. The monitoring is provided non-simultaneously.
2) PDSCH reception, on up to M Serving Cells on same frequency, non-simultaneously.
3) DL assignments with cell indicator (CIF for CA cross scheduling can be reused, and thus no new DCI format needs to be defined)
4) PDSCH starting position determination by decoding of Physical Control Format Indicator Channel (PCFICH), on N Serving Cells.
5) Error correction Ack/Nack feedback, for up to N Serving Cells altogether on:
   PUSCH
   PUCCH format 1b with channel selection
      for FDD and TDD using mode a) (N/A when there are more than 4 Ack/Nack bits)
      for TDD using mode b) (time and spatial domain Ack/Nack bundling)
      only if UE supports more than 4 Ack/Nack bits, PUCCH format 3
6) CQI/PMI/RI
   aperiodic reporting, for any of the N Serving Cells (SCell), as per channel quality indicator (CQI) request in UL grants
   periodic reporting, for N Serving Cells, as per radio resource control (RRC) configuration
7) one DL-SCH (Downlink Shared Channel) and one hybrid automatic repeat request (HARQ) entity, for each of the N Serving Cells
8) HARQ entity initialization/removal at SCell addition/release
9) Procedures related to SCell activation/deactivation
10) SCell addition, modification and release
    with the (non-handover) reconfiguration procedure
    with the handover procedure
11) SCell release at RRC connection re-establishment
12) SCell measurement result inclusion in Measurement Reports
13) Best non-serving cell reporting in measurement reports
14) 'NeedForGaps' indication for each measurement band for each operating band/band combination
15) Periodical measurement on SCCs
16) Measurement reporting trigger Event A1, for SCell
17) Measurement reporting trigger Event A2, for Scell
18) Autonomous measurement identity removal
19) Measurement reporting trigger Event A6
20) SCell addition within the handover to EUTRA procedure (relevant if UE supports handover to EUTRA) In cell aggregation Dario frequency may be needed for a multiple UL PUSCH. Furthermore, PDSCH decoding may be needed for multiple composite carriers. Also, more PDCCH search space may be needed. Optimisation of these requirements by means of the user categorization can be used to manage the complexity and implementation cost of a communication device such as a mobile user equipment.

In the embodiments single frequency cell aggregation can be used to provide flexibility and benefit to overall system performance. An existing carrier aggregation capability set can be modified to allow coordinated multi-point transmission (CoMP) on a single frequency. Technically, component carriers (CC) can be configured with the same frequency to allow single frequency cell aggregation as a CoMP technique. The carrier aggregation is allowed to have cross-carrier scheduling. Cross cell scheduling can be used for example to transmit a primary cell downlink from a macro cell and a secondary cell uplink in a pico cell.

It is noted that whilst embodiments have been described in relation to LTE-Advanced, similar principles can be applied to any other communication system or indeed to further developments with LTE. Also, instead of carriers provided by a base station a carrier comprising may be provided by a communication device such as a mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein. In some other embodiments the aforementioned embodiments can be adopted for example to orthogonal frequency division multiple access (OFDMA) frequency division duplex (FDD) based mobile communication system other than LTE.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. An apparatus for a communication device, the apparatus comprising:
at least one processor; and
at least one memory including computer program code, wherein the at least one memory and the computer program code are configured, with the at least one processor, to cause the apparatus to:
signal, from the communication device to an apparatus for controlling cell aggregation, an indication of a predefined maximum number of cells on a single carrier resource that can be aggregated by the communication device; and
support cell aggregation for communications with a multiple of cells of a communication system on the single carrier resource based on the predefined maximum number of cells by configuring to receive multiple component carriers having the same frequency.

2. The apparatus according to claim 1, wherein the signalling is one of explicit and implicit.

3. The apparatus according to claim 1, wherein the apparatus is embodied in a communication device.

4. The apparatus according to claim 1, wherein the indication is signalled in capability information of the communication device.

5. The apparatus according to claim 1, wherein the maximum number of cells is defined by means of a capability information parameter.

6. The apparatus according to claim 1, wherein the communication device is configured for simultaneous at least one of transmission to and/or or reception from multiple cells on the single carrier resource.

7. The apparatus according to claim 1, wherein the communication device is configured to separate at least one of transmission and/or or reception on the single carrier resource based on time division multiplexing.

8. The apparatus according to claim 1, wherein the single carrier resource comprises a single frequency carrier.

9. The apparatus according to claim 1, wherein the predefined maximum number of cells defines the a maximum number of at least one of physical shared channels and/or or physical control channels that can be received or transmitted by the communication device.

10. The apparatus according to claim 1, configured to cause simultaneous monitoring of a plurality of identities in a search space up to the predefined maximum number of cells.

11. The apparatus according to claim 1, wherein signalling for controlling cell aggregation by the communication device is provided by a controller associated with a cell.

12. The apparatus according to claim 1, wherein signalling for controlling cell aggregation by the communication device is provided by controller apparatus associated with a plurality of cells.

13. The apparatus according to claim 1, configured to support the single frequency resource communication with multiple cells based on a set of capabilities selected from a set of capabilities for communications on a multi-frequency component carrier.

14. An apparatus for controlling cell aggregation, the apparatus comprising:
   at least one processor; and
   at least one memory including computer program code, wherein the at least one memory and the computer program code are configured, with the at least one processor, to cause the apparatus to:
   receive from a communication device information of a predefined maximum number of cells the communication device supports for cell aggregation on a single carrier resource; and
   control cell aggregation by the communication device on the single carrier resource based on the information by configuring to transmit to the communication device on a component carrier having a same frequency as a component carrier transmitted to the communication device by another apparatus during the cell aggregation.

15. The apparatus according to claim 14, configured to cause monitoring of an identity at a time in a search space up to the predefined maximum number of cells.

16. The apparatus according to claim 14, wherein the apparatus is embodied in a network element.

17. An arrangement comprising:
   a first communication device comprising an apparatus according to claim 14; and at least one second communication device,
   wherein the first communication device and the at least one second communication device are configured to provide cell aggregation on a single frequency resource based on different subsets of capabilities selected from a set of capabilities for aggregated component carrier communication on multiple frequency resources.

18. A method for cell aggregation, comprising:
   signalling, from a communication device to a network element, information regarding a predefined maximum number of cells that can be aggregated by the communication device on a single carrier resource; and
   supporting cell aggregation for communications by the communication device on the single carrier resource with a multiple of cells up to said predefined maximum number of cells by configuring to receive multiple component carriers having the same frequency.

19. The method according to claim 18, comprising communicating an indication of the predefined maximum number of cells from the communication device to a controller of at least one cell.

20. The method according to claim 18, wherein signalling of the information of the predefined maximum number of cells is explicit.

21. The method according to claim 18, comprising signalling a capability information parameter defining the predefined maximum number of cells.

22. The method according to claim 18, wherein signalling of the information of the predefined maximum number of cells is implicit.

23. The method according to claim 18, wherein the information of the predefined maximum number of cells is signalled in response to a request for capability information.

24. The method according to claim 18, comprising simultaneous at least one of transmission to and/or or reception from multiple cells on the single carrier resource by the communication device.

25. The method according to claim 18, comprising separating at least one of transmission and/or or reception on the single carrier resource based on time division multiplexing.

26. The method according to claim 18, wherein the single carrier resource comprises a single frequency carrier.

27. The method according to claim 18, wherein the predefined maximum number of cells defines the a maximum number of at least one of physical shared channels and/or or physical control channels that can be received or transmitted by the communication device.

28. The method according to claim 18, comprising monitoring for identities in a search space up to the predefined maximum number of cells.

29. The method according to claim 18, wherein signalling for controlling the cell aggregation is provided from a cell or from a plurality of cells depending on the capability category of the communication device.

30. The method according to claim 29, comprising granting by one of the cells a physical downlink shared channel provided by any of the multiple of cells.

31. The method according to claim 18, comprising supporting single frequency resource communication with a multiple of cells based on a set of capabilities selected from a set of capabilities for communications on a multi-frequency component carrier.

32. The method according to claim 18, wherein downlink assignments are provided either with or without a cell indicator depending on the capability category of the communication device.

33. The method according to claim 18, comprising controlling power on a serving cell basis.

34. The method according to claim 18 performed by a program code stored on a non-transitory computer-readable medium and executed by at least one processor.

35. A method for controlling cell aggregation, comprising:
   receiving, at a network element from a communication device, information of a predefined maximum number of cells the communication device supports for cell aggregation on a single carrier resource; and
   controlling cell aggregation on the single carrier resource by the communication device on the single carrier resource based on the information by configuring to transmit to the communication device on a component carrier having a same frequency as a component carrier transmitted to the communication device by another apparatus during the cell aggregation.

* * * * *